US008366898B2

(12) United States Patent
Kim et al.

(10) Patent No.: US 8,366,898 B2
(45) Date of Patent: Feb. 5, 2013

(54) SYSTEM AND METHOD FOR HIGH THROUGHPUT PARTICLE SEPARATION

(75) Inventors: Byung Kyu Kim, Gimpo-si (KR); Young Ho Kim, Seoul (KR)

(73) Assignee: University Industry Cooperation Foundation Korea Aerospace University, Goyang-Si, Gyeonggi-Do (KR)

( * ) Notice: Subject to any disclaimer, the term of this patent is extended or adjusted under 35 U.S.C. 154(b) by 387 days.

(21) Appl. No.: 12/614,541

(22) Filed: Nov. 9, 2009

(65) Prior Publication Data

US 2010/0116665 A1 May 13, 2010

(30) Foreign Application Priority Data

Nov. 13, 2008 (KR) ........................ 10-2008-0112695

(51) Int. Cl.
*G01N 27/26* (2006.01)
*B01D 57/02* (2006.01)

(52) U.S. Cl. ........................................ 204/547; 204/643

(58) Field of Classification Search .................. 204/547, 204/600–643

See application file for complete search history.

(56) References Cited

U.S. PATENT DOCUMENTS 3,807,137 A * 4/1974 Romell ............................. 95/72
5,626,734 A * 5/1997 Docoslis et al. .............. 204/547
5,845,783 A * 12/1998 Smith ........................ 209/127.4
2004/0011651 A1* 1/2004 Becker et al. ................. 204/547
2005/0207940 A1* 9/2005 Butler et al. ..................... 422/73
2006/0289341 A1* 12/2006 Muller et al. ................. 209/210
2007/0020767 A1* 1/2007 Schnelle ....................... 436/180
2007/0163883 A1* 7/2007 Schnelle et al. .............. 204/547
2008/0011608 A1* 1/2008 Pham et al. ................... 204/643
2010/0219076 A1* 9/2010 Yamakawa et al. ........... 204/547

FOREIGN PATENT DOCUMENTS

WO WO2009/044902 * 4/2009

* cited by examiner

*Primary Examiner* — J. Christopher Ball
*Assistant Examiner* — Jennifer Dieterle
(74) *Attorney, Agent, or Firm* — Kile Park Goekjian Reed & McManus PLLC

(57) ABSTRACT

The high throughput particle separation system includes an aqueous solution container for storing an aqueous solution containing specific particles to be separated, an electrode array, having a plurality of electrodes arranged at regular intervals or at various different intervals in series or in parallel, for deflecting specific particles simultaneously in a non-uniform electric field according to sizes and dielectric properties of the particles to separate a large quantity of the particles at high throughput, a path separation unit for establishing movement paths of the particles separated by the electrode array, and a control unit for applying the same voltage and frequency or different voltages and frequencies to the electrodes of the electrode array based on sizes and dielectric properties of specific particles to be separated.

11 Claims, 13 Drawing Sheets

SYSTEM AND METHOD FOR HIGH THROUGHPUT PARTICLE SEPARATION

BACKGROUND OF THE INVENTION

1. Field of the Invention

The present invention relates to a system and method for high throughput particle separation to deflect only specific particles based on sizes and dielectric properties of the particles, using an electrode array, including a plurality of electrodes each constructed in the form of a cantilever to which a voltage is applied, arranged in a path along which particles move in the direction of gravity, thereby separating the particles at high throughput.

2. Description of the Related Art

Various technologies have been proposed in order to realize high throughput sorting, which is one type of cell separation technology. Among them are dielectrophoresis (DEP) and deterministic lateral displacement (DLD), which are being principally spotlighted.

In connection with the dielectrophoresis, it is well known that dielectrically polarizable particles are subjected to dielectrophoretic force in a nonuniform electric field when effective polarizability of the particles is different from that of the surrounding media although the particles have no electric charges. As widely known in connection with electrophoresis, the movement of particles is not determined by electric charges of the particles but by dielectric properties (conductivity and permittivity) of the particles.

However, the utilization of the dielectrophoresis is possible only by the provision of an expensive micro syringe pump that allows particles to move at a velocity of less than 5 μl/min, and, in addition, errors may occur according to the change in size of the particles.

On the other hand, the deterministic lateral displacement has advantages in that it is possible to separate particles while correctly coping with the change in size of particles, and it is possible to move particles at a velocity of 20 μl/min, which is faster than in the dielectrophoresis, thereby achieving separation of particles faster than in the dielectrophoresis. However, the deterministic lateral displacement has a great problem in that it is not possible to separate particles based on dielectric properties thereof.

In order to solve this disadvantage, attempts have been made to apply the dielectrophoresis to a micro structure using the deterministic lateral displacement. However, proper velocity and considerable time are required to process a large quantity of samples, by which efficiency is lowered.

That is, the conventional particle separation methods have problems in that considerable time is required to separate particles based on sizes and dielectric properties of the particles. Also, a small quantity of particles is processed using an expensive micro syringe pump and a micro channel, with the result that considerable time is required to obtain target particles. For bio particles such as cells, separation carried out for a long period of time may cause viability-related problems.

SUMMARY OF THE INVENTION

Therefore, the present invention has been made in view of the above problems, and it is an object of the present invention to provide a system and method for high throughput particle separation to deflect only specific particles based on sizes and dielectric properties of the particles, using an electrode array, including a plurality of electrodes each constructed in the form of a cantilever or a bridge, to which a voltage is applied, arranged in a path along which particles move in the direction of gravity, thereby separating the particles at high throughput.

It is another object of the present invention to provide a system and method for high throughput particle separation to simultaneously apply sizes and dielectric properties of particles without a micro syringe pump and a micro channel, thereby efficiently separating the particles at high throughput.

It is yet another object of the present invention to provide a system and method for high throughput particle separation to simultaneously move a large quantity of particles only by weight of the particles without a micro syringe pump and to deflect only specific particles based on sizes and dielectric properties of the particles by voltages applied to electrodes, thereby separating the particles.

In accordance with an aspect of the present invention, the above and other objects can be accomplished by the provision of a high throughput particle separation system for separating particles including an electrode array, having a plurality of electrodes arranged at intervals, for deflecting specific particles simultaneously in a nonuniform electric field according to sizes and dielectric properties of the particles to separate a large quantity of the particles at high throughput.

The high throughput particle separation system may further include an aqueous solution container for storing an aqueous solution containing specific particles to be separated, an angle adjustment unit for adjusting angles of the electrodes of the electrode array to adjust movement velocity of the particles, a control unit for applying the same voltage and frequency or different voltages and frequencies to the respective electrodes of the electrode array based on sizes and dielectric properties of specific particles to be separated, and a path separation unit for establishing movement paths of the particles separated by the electrode array.

In accordance with another aspect of the present invention, there is provided a high throughput particle separation system for separating particles including an aqueous solution container for storing an aqueous solution containing specific particles to be separated, an electrode array, having a plurality of electrodes arranged at intervals, for deflecting specific particles simultaneously in a nonuniform electric field according to sizes and dielectric properties of the particles to separate a large quantity of the particles at high throughput, a path separation unit for establishing movement paths of the particles separated by the electrode array, and a control unit for variably applying voltages and frequencies to the respective electrodes of the electrode array based on sizes and dielectric properties of the specific particles.

In accordance with yet another aspect of the present invention, there is provided a high throughput particle separation method for separating particles using an electrode array including applying voltages and frequencies to electrodes of the electrode array based on properties of particles to be separated to form a nonuniform electric field and an imaginary distance between the respective electrodes, introducing an aqueous solution containing the particles to be separated, and deflecting only specific particles based on sizes and dielectric properties of the particles to separate the particles at high throughput.

The high throughput particle separation method may further include differently establishing movement paths of the particles separated at the high throughput for the respective particles and adjusting angles of the electrodes of the electrode array to adjust movement velocity of the particles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. In the following, a detailed description of known functions and configurations incorporated herein will be omitted when it may make the subject matter of the present invention rather unclear.

Figure 1:
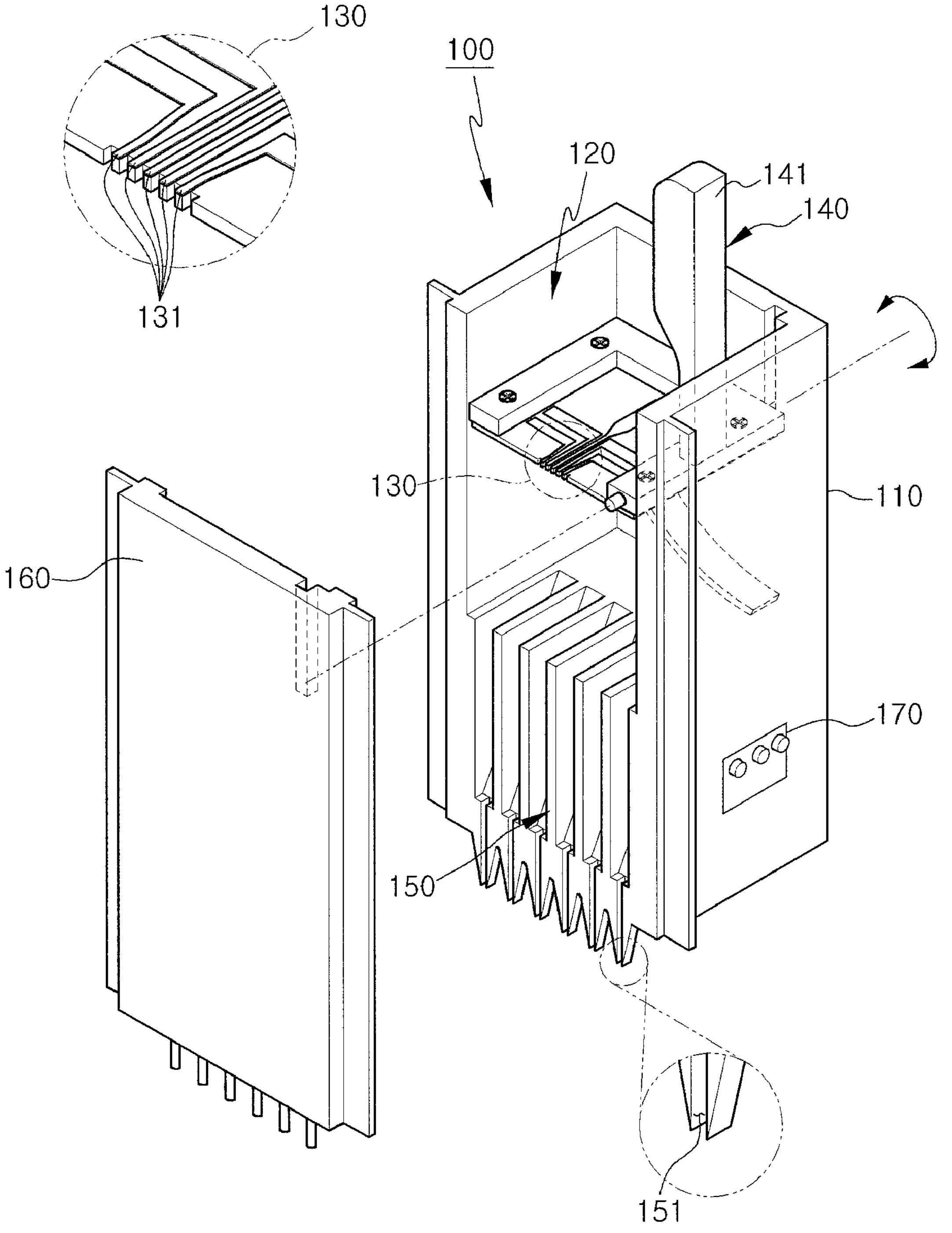
FIG. 1 is a schematic construction view illustrating a high throughput particle separation system according to an embodiment of the present invention.

FIG. 1 is a schematic view illustrating the construction of a high throughput particle separation system 100 according to a preferred embodiment of the present invention. The high throughput particle separation system 100 includes an aqueous solution container 120 disposed at the upper part of a system body 110 for storing an aqueous solution containing specific particles to be separated and an electrode array 130 composed of electrodes 131 disposed below the aqueous solution container 120 for separating specific particles at high throughput using sizes and dielectric properties of particles that are movable only by their weight among aqueous solution particles stored in the aqueous solution container 120.

Also, the high throughput particle separation system 100 further includes an angle adjustment unit 140 having one end coupled in the system body 110 and the other end protruding outward from the system body 110 for adjusting angles of the electrodes 131 of the electrode array 130 according to manual user manipulation to adjust movement velocity of particles.

Also, the high throughput particle separation system 100 further includes a path separation unit 150 disposed at the lower part of the system body 110 for establishing movement paths of the particles separated by the electrode array 130.

Also, the high throughput particle separation system 100 further includes a cover 160 for protecting components disposed in the system body 110 and preventing the aqueous solution stored in the aqueous solution container 120 from being discharged outward.

Also, the high throughput particle separation system 100 further includes a control unit 170 provided outside the system body 110 for applying voltages and frequencies to the respective electrodes 131 of the electrode array 130 based on sizes and dielectric properties of specific particles to be separated.

The control unit 170 may include a voltage adjustment knob for allowing a user to set voltages, a frequency adjustment knob for allowing the user to set frequencies, a power supply switch, and a button for other manipulation control. Also, the control unit 170 may further include a central processing unit (CPU) for control and a memory for data storage.

As described above, the control unit 170 is provided at the system body 110. Alternatively, the control unit 170 may be embodied as an independent product separated from the high throughput particle separation system 100. In this case, the control unit 170 may be connected to the high throughput particle separation system 100 via a connector.

Meanwhile, a power supply cable connected between the electrode array 130 and the control unit 170 is not shown in the drawing for the sake of simplicity. In fact, however, the power supply cable is connected between the electrode array 130 and the control unit 170 through the system body 110.

In the high throughput particle separation system 100 constructed as described above, the respective electrodes 131 of the electrode array 130 are properly adjusted by the angle adjustment unit 140 so as to adjust movement velocity of particles in a state in which the cover 160 is coupled to a predetermined position of the system body 110. Angle adjustment is carried out as follows: when an adjustment lever 141 is manually pulled, a shaft connected to the adjustment lever 141 through a hinge 142 is rotated. A tilt angle is adjusted based on the amount of rotation of the shaft.

The tilt angle has an influence on time for which an aqueous solution containing particles to be separated moves. Therefore, it is preferable to properly adjust the tilt angle in consideration of amount of an aqueous solution to be separated and time for which the aqueous solution is separated.

Subsequently, voltages and frequencies are applied to the electrodes 131 of the electrode array 130 through the control unit 170.

Figure 2:
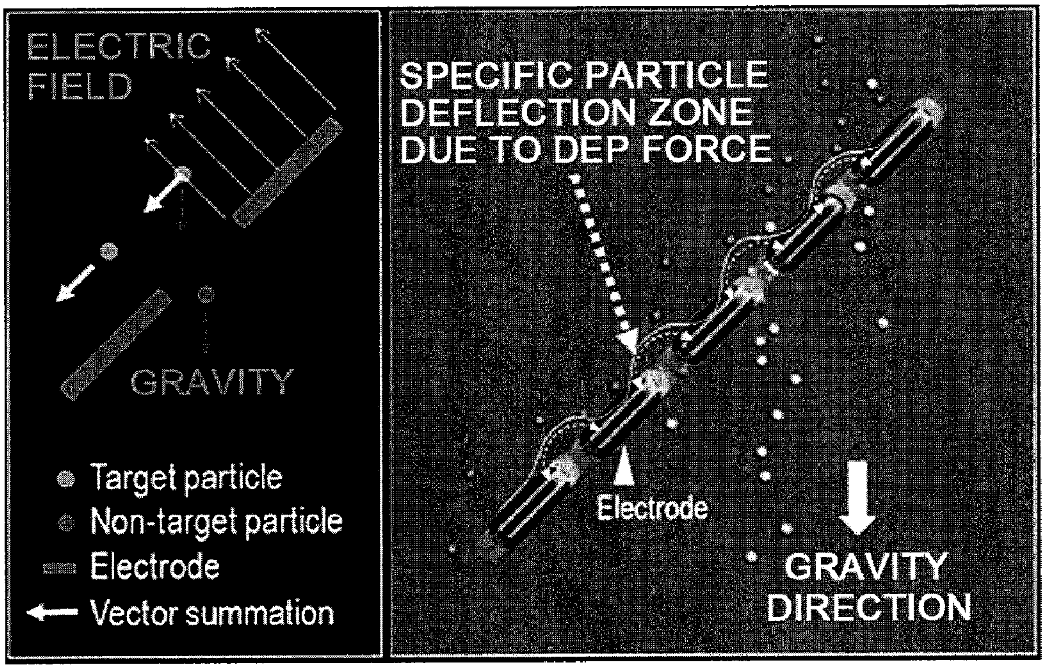
FIG. 2 is a principle view illustrating a principle of specific particle deflection due to dielectrophoretic (DEP) force in the present invention.

Each of the electrodes 131 is constructed in the form of a cantilever or a bridge. As shown in FIG. 2, the electrodes 131 are arranged at arbitrary intervals. Also, the electrodes 131 are arranged such that the positive poles (+) and the negative poles (−) alternate. Distances (gaps) between the respective electrodes may be different from one another in consideration of sizes of specific particles to be separated. Alternatively, distances between the respective electrodes may be the same.

When the number of arranged electrodes is increased, it is possible to separate particles at higher throughput. However, it is preferable to properly establish the number of the electrodes in consideration of the size of the high throughput particle separation system or various other conditions.

When alternating current voltages having specific frequencies are applied to the electrodes arranged as described above, as shown in FIG. 2, specific particle deflection zones occur due to dielectrophoretic (DEP) force. Specifically, when alternating current voltages having specific frequencies are applied to the electrodes, nonuniform electric fields are created in the vicinity of the electrodes. The magnitudes of the electric fields are affected by the applied voltage and frequency. Also, the sizes of the specific particle deflection zones are varied by the applied voltage and frequency.

Figure 3A:
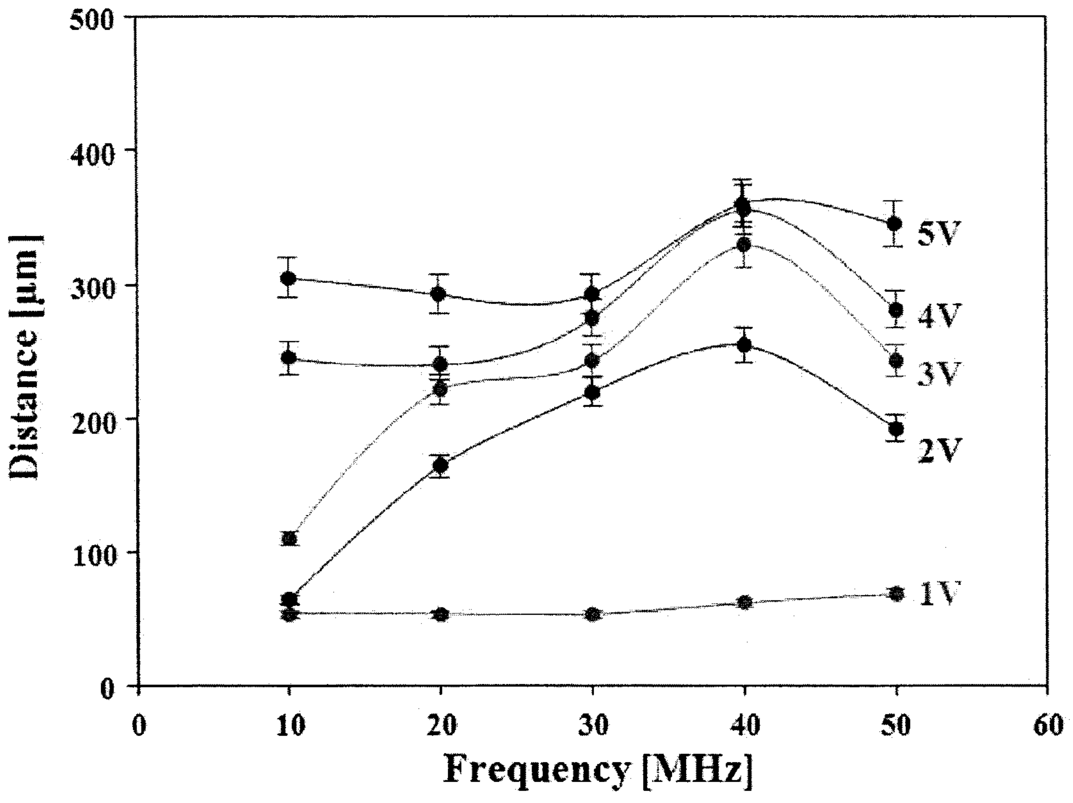
FIGS. 3A to 3C are views illustrating relations between voltages and frequencies applied to electrodes and particle deflection distances.
Figure 3B:
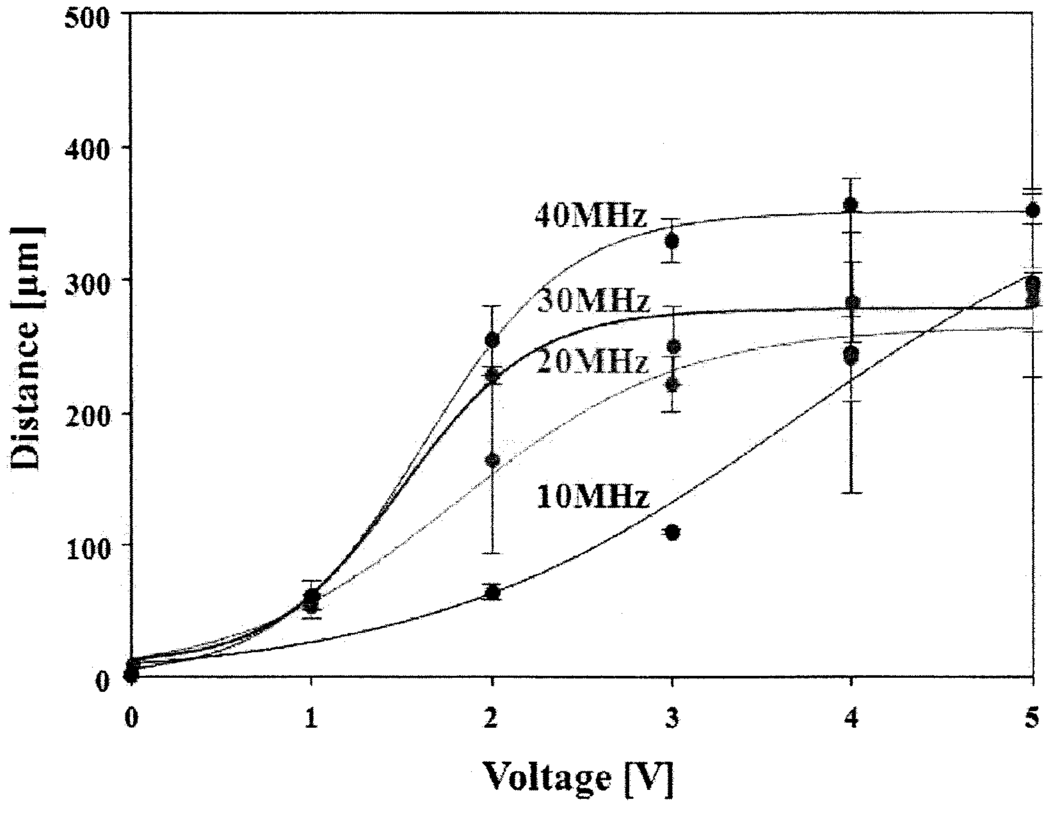
Figure 3C:
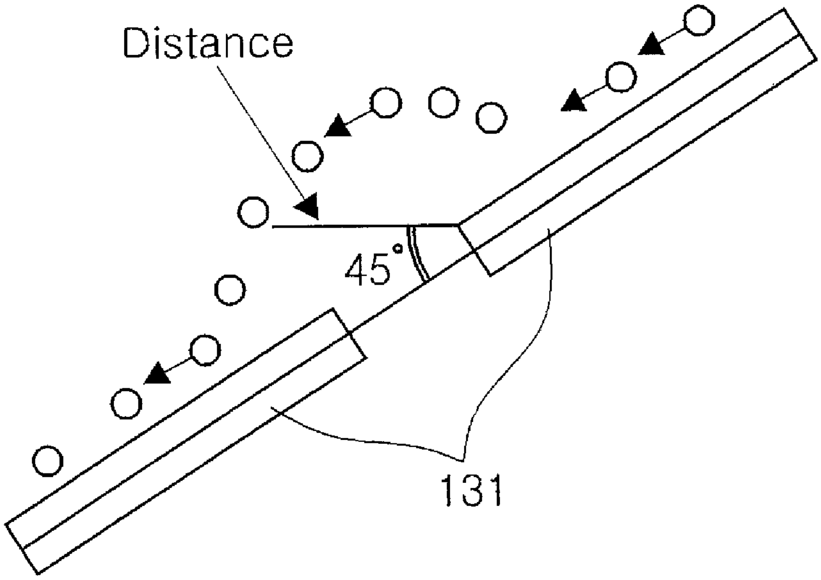

FIG. 3A illustrates the change of distances [μm] based on frequencies [MHz] applied to the electrodes, FIG. 3B illustrates the change of distances [μm] based on voltages [V] applied to the electrodes, and FIG. 3C illustrates an example of a deflection zone created by frequencies and voltages when using the above relations.

Alternating current voltages having specific frequencies are applied to the electrodes through such a process to create specific particle deflection zones due to DEP force, and an aqueous solution containing specific particles to be separated is supplied to the aqueous solution container 120.

The supplied aqueous solution sinks by gravity. Also, the supplied aqueous solution moves along electrode surfaces of the respective electrodes 131 since the electrodes 131 are tilted. At this time, some of the particles are deflected due to dielectric properties of the specific particles, and the remaining particles pass through the gaps between the respective electrodes. As a result, the specific particles are separated from nonspecific particles.

Also, the gaps between the respective electrodes may function as filters based on the sizes of the particles by variously changing the gaps between the respective electrodes simultaneously while using such dielectrophoresis.

The gaps between the respective electrodes may be primarily established by a method of arranging the electrodes of the electrode array based on predetermined gaps between the electrodes of the electrode array and secondarily varies by a method of adjusting voltages and frequencies.

Figure 4:
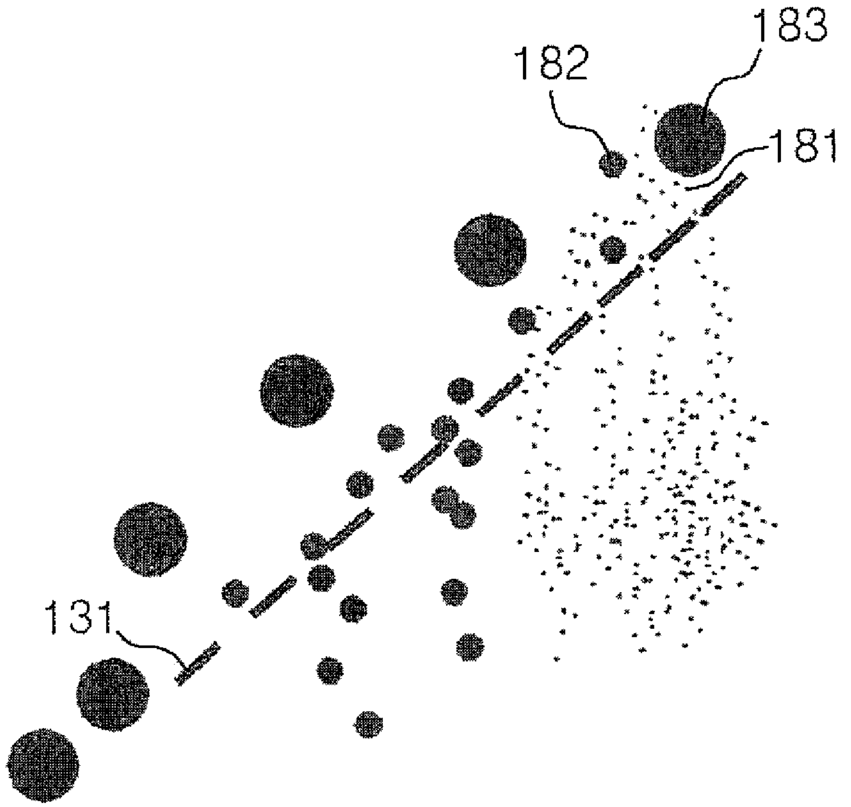
FIG. 4 is a view illustrating a particle separation method based on sizes and dielectric properties of particles in the present invention.

FIG. 4 is a principle view illustrating that separation between cells is simultaneously possible based on sizes and dielectric properties of particles. Here, small-sized particles 181 exhibit no dielectric properties, middle-sized particles 182 exhibit slight dielectric properties, and large-sized particles 183 exhibit high dielectric properties.

Dielectric properties are previously established for materials. Particles (polystyrene beads) and an aqueous solution (buffer) used in experiments according to the present invention have the following properties:

For the polystyrene beads,
Permittivity: 1
Conductivity: 2e-4 s/m
Density: 1,050 kg/$m^3$
Size: 25 μm
For the buffer,
Permittivity: 78
Conductivity: 0.02 s/m
Density: 999 kg/$m^3$
Viscosity: 1e-3 kg/ms The particles separated through such a process move through the path separation unit 150. The path separation unit 150 serves to allow the separated particles to flow through specific paths for particles. The paths of the path separation unit 150 may be generally embodied by tubes.

The path separation unit 150 is provided at the lower end thereof with discharge ports 151, through which the separated particles, having flowed through the respective paths, are discharged to adjust the flow of the particles.

Figure 5A:
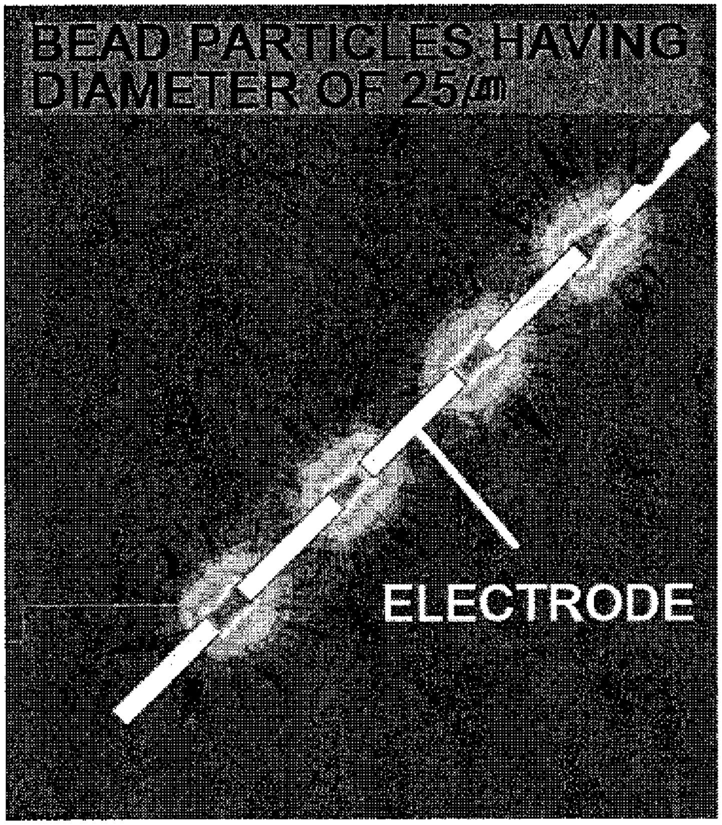
FIGS. 5A to 5D are views illustrating simulation results of the present invention.

FIGS. 5A to 5D are views illustrating simulation results of the present invention as described above. As shown in FIG. 5A, deflection of particles based on dielectric properties of the particles occurs due to nonuniform electric fields created at the electrodes, with the result that the particles do not pass through the gaps between the respective electrodes but are deflected (the flow directions of the particles are changed).

Figure 5B:
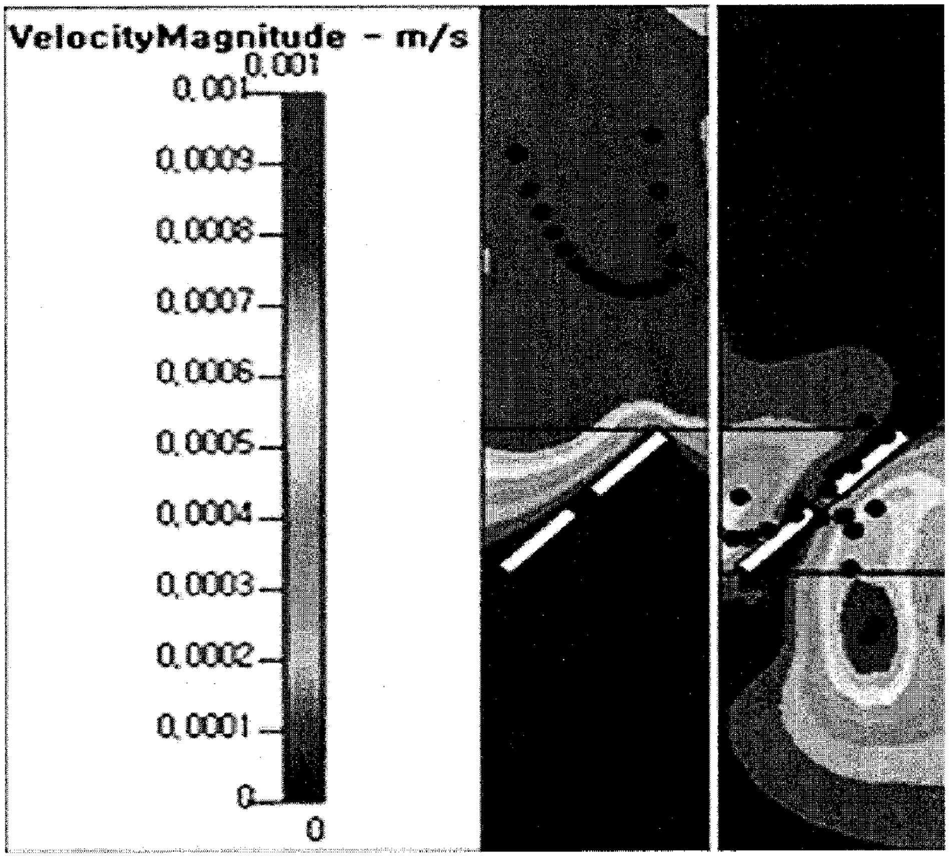
Figure 5C:
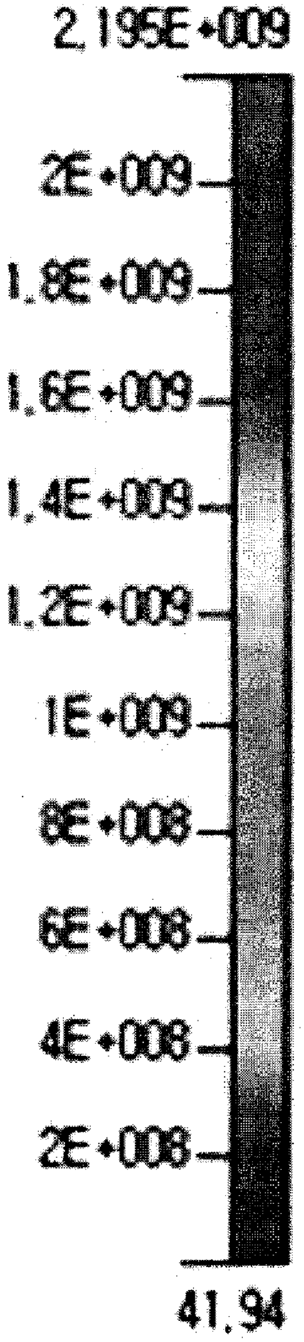
Figure 5D:
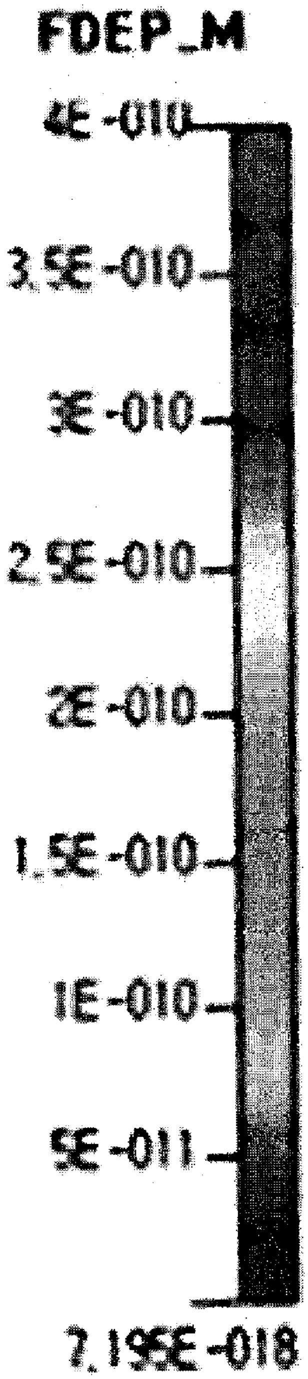

FIG. 5B illustrates that cells pass through the gaps between the respective electrodes due to gravity when no voltage and frequency are applied to the electrodes. FIG. 5C illustrates values of electric fields created in the vicinity of the electrodes when particles each having a size of 25 μm are actually loaded. FIG. 5D illustrates values of DEP fields to which particles are subjected in the vicinity of the electrodes when particles each having a size of 25 μM are actually loaded.

Figure 6A:
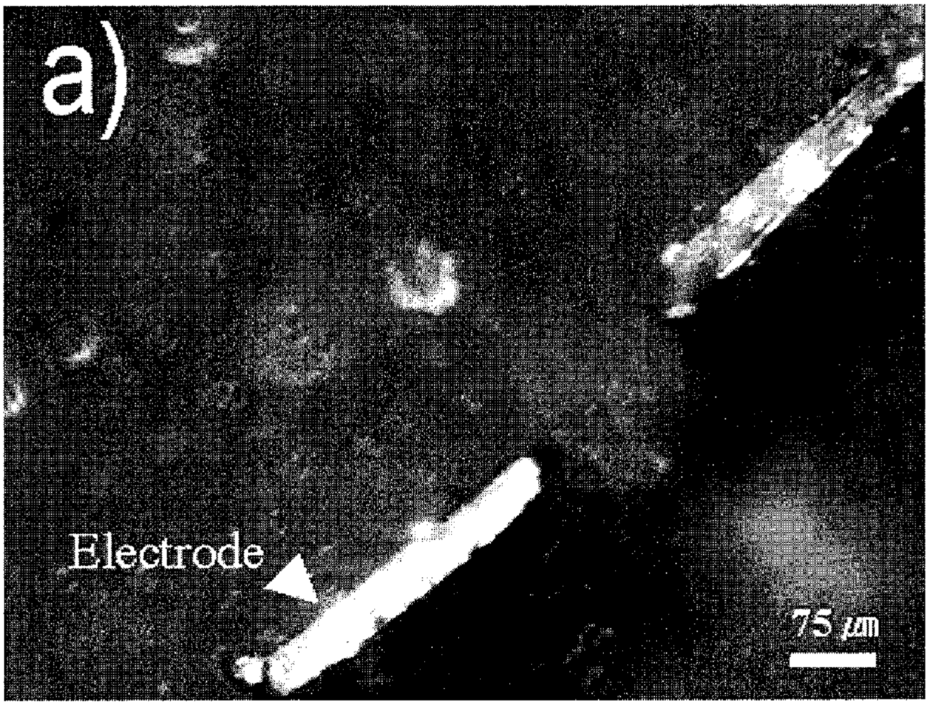
FIGS. 6A and 6B are views illustrating experiment results obtained using a preferred embodiment of the present invention.
Figure 6B:
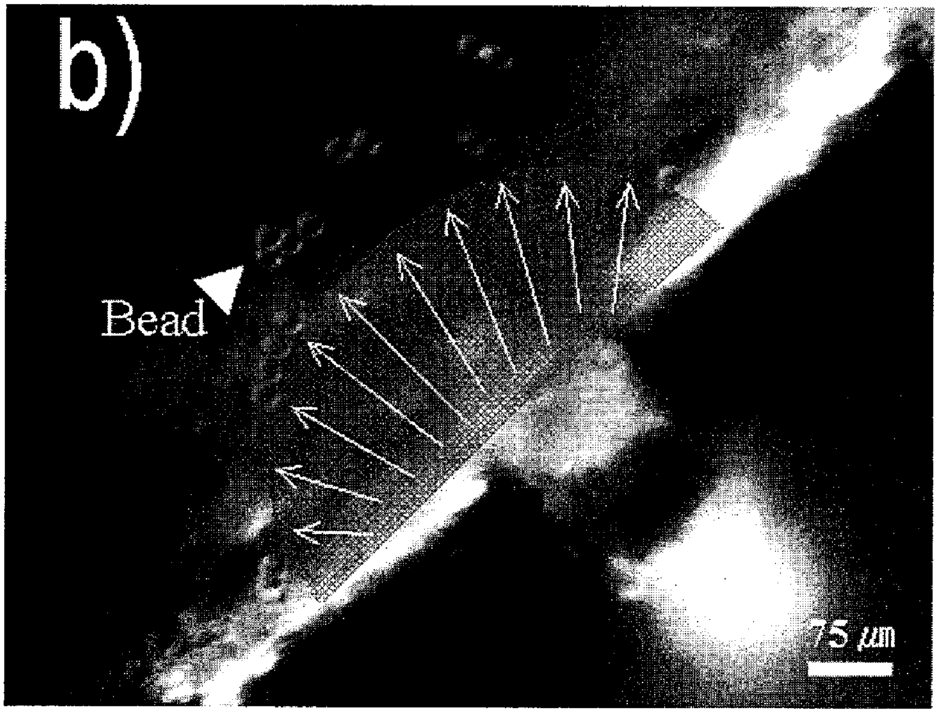

FIGS. 6A and 6B are views illustrating experiment results actually obtained using a preferred embodiment of the present invention.

FIG. 6A illustrates that cells pass through the gap between the electrodes due to gravity in a state in which no voltage and frequency are applied to the electrodes.

FIG. 6B illustrates that particles, subjected to negative DEP force, do not move toward the electrodes but are deflected when a voltage (3 V) and a frequency (40 MHz sine wave) are applied to the electrodes. In FIG. 6B, arrows indicate spaces where the deflected particles do not enter the gap between the electrodes.

Figure 7:
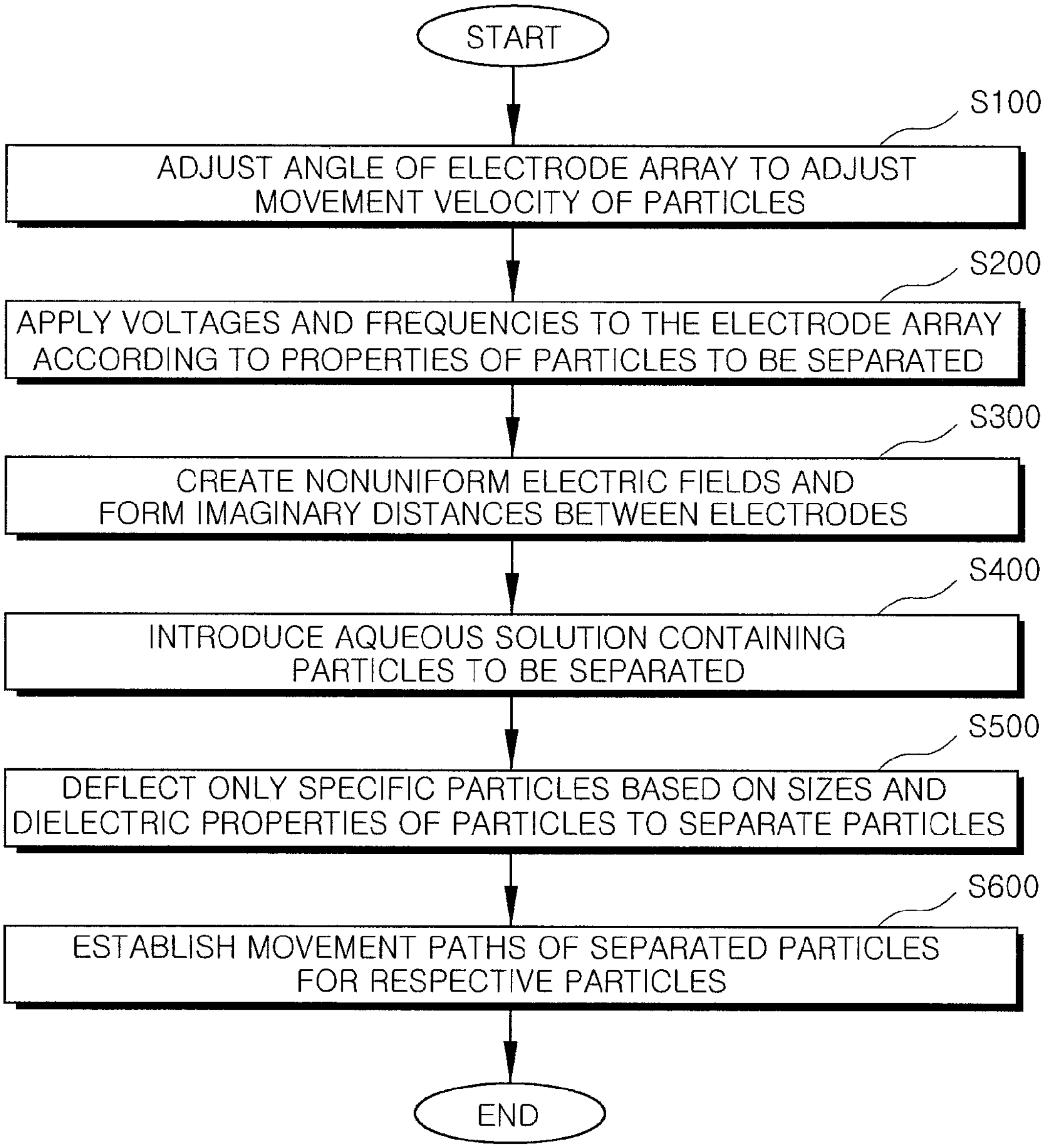
FIG. 7 is a flow chart illustrating a high throughput particle separation method according to an embodiment of the present invention.

FIG. 7 is a flow chart illustrating a high throughput particle separation method according to an embodiment of the present invention. S indicates a step.

The high throughput particle separation method includes a step of adjusting an angle of the electrode array to adjust movement velocity of particles (S100), a step of applying voltages and frequencies to the electrode array according to properties of particles to be separated to create nonuniform electric fields and form imaginary distances between the respective electrodes (S200, S300), a step of introducing an aqueous solution containing the particles to be separated (S400), a step of deflecting only specific particles based on sizes and dielectric properties of the particles to separate the particles at high throughput (S500), and a step of differently establishing movement paths of the particles separated at high throughput for the respective particles (S600).

In the high throughput particle separation method constructed as described above, the angle of the electrode array is arbitrarily adjusted through the angle adjustment unit to control (establish) movement velocity of particles in a state in which the electrode array is constructed such that the distances (gaps) between the electrodes are established, the positive poles and the negative poles of the electrodes alternate, and the electrodes are arranged in series or in parallel (S100). Here, the movement velocity of the particles may be previously established. Alternatively, it is possible to adjust the movement velocity of the particles during particle separation as needed.

Subsequently, voltages and frequencies are applied to the electrode array according to properties of particles to be separated (S200). Here, the applied voltage and frequency are preferably established in consideration of properties (for example, sizes or dielectric properties) of the particles to be separated. The voltage and frequencies applied to the respective electrodes may be the same or different as needed.

When voltages having specific frequencies are applied to the electrode array, nonuniform electric fields are created in the vicinity of the electrodes, as previously described, and imaginary distances between the respective electrodes are formed according to the sizes of the nonuniform electric fields (S300).

Subsequently, when aqueous solution containing the particles to be separated is introduced (S400), only specific particles are deflected based on sizes and dielectric properties of the particles, and nonspecific particles pass through the gaps between the respective electrodes due to gravity (S500).

Subsequently, movement paths of the particles separated based on sizes and dielectric properties of the particles are differently established for the respective particles, and the particles are moved (S600).

In this way, the particles are separated. Therefore, it is possible to separate specific particles from a large amount of an aqueous solution at high throughput, thereby improving particle separation efficiency and, in addition, achieving cell separation without affecting viability.

As is apparent from the above description, the electrode array is disposed at the paths of particles moving in the direction of gravity, and the particles are separated through the deflection based on the sizes and dielectric properties of the particles. Consequently, it is possible to separate a large quantity of particles at high throughput without the provision of an expensive micro syringe pump.

Also, since the large quantity of particles are separated at high throughput, it is possible to prevent viability deterioration which may be caused when separating bio particles such as cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high throughput particle separation apparatus for separating particles comprising a unitary body, the unitary body housing:

an aqueous solution container for storing an aqueous solution containing particles comprising specific particles to be separated and non-specific particles;

an electrode array provided below the aqueous container, the electrode array having a plurality of electrodes arranged at various intervals along a direction inclined relative to a gravity direction along which the particles are moved to deflect the specific particles in a non-uniform electric field according to sizes and dielectric properties of the particles and allow the non-specific particles to pass through the different intervals, wherein the electrode array is in communication with a control unit for variably applying voltage and frequencies to the respective electrodes of the electrode array based on sizes and dielectric properties of the specific particles; and a path separation unit provided below the electrode array, including a plurality of separation walls arranged at intervals along a direction perpendicular to the direction of the gravity, and being upright parallel to the direction of the gravity to establish movement paths of the separated by the electrode array according to the sizes and the dielectric properties.

2. The high throughput particle separation apparatus according to claim 1, wherein each of the electrodes of the electrode array is disposed in a path along which the particles move in a direction of gravity in the form of a cantilever or bridge, the electrode array separates the particles based on the sizes of the particles through adjustment of gaps between the respective electrodes of the electrode array, and the electrode array differently deflects the particles according to permittivity and conductivity of each of the particles through application of the same power or various different powers to the respective electrodes of the electrode array.

3. The high throughput particle separation apparatus according to claim 1, further comprising:

an angle adjustment unit for adjusting angles of the electrodes of the electrode array to adjust movement velocity of the particles.

4. A method for high throughput particle separation comprising:

introducing an aqueous solution to an aqueous solution container of a high throughput particle separation apparatus comprising a unitary body, the unitary body comprising the aqueous solution container disposed in an upper portion of the body, an electrode array disposed below the aqueous container, and a path separation unit provided below the electrode array, wherein the aqueous solution comprises specific particles to be separated and non-specific particles;

separating the specific particles from the aqueous solution utilizing the electrode array, the electrode array comprising a plurality of electrodes arranged at various intervals along a direction inclined relative to a gravity direction along which the particles are moved to deflect the specific particles in a non-uniform electric field according to sizes and dielectric properties of the particles and allow the non-specific particles to pass through the different intervals, wherein the electrode array is in communication with a control unit for variably applying voltage and frequencies to the respective electrodes of the electrode array based on size and dielectric properties of the specific particles; and directing the particles into the path separation unit, wherein the path separation unit comprises a plurality of separation walls arranged at intervals along a direction perpendicular to the direction of gravity, and being upright parallel to the direction of gravity to establish movement paths of the particles separated by the electrode array according to the sizes and the dielectric properties.

5. The method of claim 4, wherein each of the electrodes of the electrode array is disposed in the path along which the particles move in the direction of the gravity in the form of a cantilever.

6. The method of claim 4, wherein each of the electrodes of the electrode array is disposed in a path along which the particles move in a direction of gravity in the form of a bridge.

7. The method of claim 4, wherein the plurality of electrodes are arranged in series or in parallel.

8. The method of claim 4, wherein the electrode array differently deflects the particles according to permittivity and conductivity of each of the particles through application of various different powers to the respective electrodes of the electrode array.

9. The method of claim 4, wherein the electrodes of the electrode array have the same length, area and shape, or different lengths, areas and shapes.

10. The method of claim 4, further comprising:

adjusting the angles of the electrodes of the electrode array utilizing an angle adjustment unit to adjust movement velocity of the particles.

11. The method of claim 4, wherein the path separation unit is provided at a lower end thereof with discharge ports, through which the separated particles are discharged to move the particles at high throughput.

* * * * *